(12) United States Patent
Farmanbar et al.

(10) Patent No.: US 10,779,251 B2
(45) Date of Patent: Sep. 15, 2020

(54) TIMING ADVANCE IN NEW RADIO

(71) Applicant: Huawei Technologies Co., Ltd., Shenzhen (CN)

(72) Inventors: Hamidreza Farmanbar, Ottawa (CA); Mohammadhadi Baligh, Ottawa (CA); Aman Jassal, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 16/141,709

(22) Filed: Sep. 25, 2018

(65) Prior Publication Data

US 2020/0100201 A1 Mar. 26, 2020

(51) Int. Cl.
*H04W 74/08* (2009.01)
*H04W 56/00* (2009.01)
*H04W 84/04* (2009.01)

(52) U.S. Cl.
CPC ...... *H04W 56/0015* (2013.01); *H04W 84/042* (2013.01)

(58) Field of Classification Search
CPC .......... H04W 56/0015; H04W 84/042; H04W 72/04; H04L 27/18
See application file for complete search history.

(56) References Cited

U.S. PATENT DOCUMENTS

| 8,964,645 | B2 | 2/2015 | Kwon et al. | |
|---|---|---|---|---|
| 2012/0257570 | A1* | 10/2012 | Jang | H04W 56/005 370/328 |
| 2013/0064165 | A1* | 3/2013 | Chen | H04W 56/0045 370/312 |
| 2017/0346685 | A1 | 11/2017 | Wang et al. | |
| 2019/0268853 | A1* | 8/2019 | Dinan | H04W 56/0015 |

FOREIGN PATENT DOCUMENTS

| CN | 105790911 A | 7/2016 |
|---|---|---|
| CN | 104221453 B | 3/2018 |
| EP | 2800428 A1 | 11/2014 |

OTHER PUBLICATIONS

3rd Generation Partnership Project; Technical Specification Group Radio Access Network; NR; Physical layer procedures for control (Release 15), 3GPP TS 38.213, Mar. 2018, V15.1.0.
3rd Generation Partnership Project; Technical Specification Group Radio Access Network; NR; Physical layer procedures for data (Release 15), 3GPP TS 38.214, Mar. 2018, V15.1.0.

(Continued)

*Primary Examiner* — Wei Zhao
(74) *Attorney, Agent, or Firm* — Slater Matsil, LLP

(57) ABSTRACT

According to one aspect of the present disclosure, a method for uplink synchronization is provided, wherein the method includes receiving, by a user equipment (UE), a radio resource control (RRC) message from a network, the RRC message comprising a first Timing Advance Group (TAG) identity (ID) and a second TAG ID different than the first TAG ID. The method also includes transmitting, by the UE, a first signal over a component carrier in accordance with a timing advance associated with the first TAG ID and a second signal over the component carrier in accordance with a timing advance associated with the second TAG ID.

24 Claims, 7 Drawing Sheets

(56) References Cited

OTHER PUBLICATIONS

3rd Generation Partnership Project; Technical Specification Group Radio Access Network; NR; Medium Access Control (MAC) protocol specification (Release 15), 3GPP TS 38.321, Mar. 2018, V15.1.0.
3rd Generation Partnership Project; Technical Specification Group Radio Access Network; NR; Radio Resource Control (RRC) protocol specification (Release 15), 3GPP TS 38.331, Mar. 2018, V15.1.0.
Ericsson, "Timing advance in NR", 3GPP TSG-RAN WG2 #99bis, R2-1711168, 6 Pages, Oct. 9-13, 2017, Prague, Czech Republic.

* cited by examiner

TIMING ADVANCE IN NEW RADIO

TECHNICAL FIELD

The present disclosure relates to wireless communications, and in particular embodiments, to systems and methods for performing uplink synchronization.

BACKGROUND

Conventional synchronization techniques often require a user equipment (UE) to apply the same timing advance to its uplink transmissions communicated to the same base station over the same component carrier. Such techniques may be unsuitable for next generation wireless networks, where uplink transmissions over the same component carrier may travel through separate propagation paths, and thus have different propagation delays. To solve the above issue, advanced uplink synchronization techniques are desired.

SUMMARY

Technical advantages are generally achieved, by embodiments of this disclosure which describe uplink synchronization methods for applying separate timing advances to different uplink transmissions.

According to one aspect of the present disclosure, a method for uplink synchronization is provided, wherein the method includes receiving, by a user equipment (UE), a radio resource control (RRC) message from a network, the RRC message comprising a first Timing Advance Group (TAG) identity (ID) and a second TAG ID different than the first TAG ID. The method also includes transmitting, by the UE, a first signal over a component carrier in accordance with a timing advance associated with the first TAG ID and a second signal over the component carrier in accordance with a timing advance associated with the second TAG ID.

Optionally, in some embodiments of any of the preceding aspects, the first signal is transmitted to a first base station and the second signal is transmitted to a second base station.

Optionally, in some embodiments of any of the preceding aspects, the first signal and the second signal are transmitted to a same base station using separate beams.

Optionally, in some embodiments of any of the preceding aspects, the first TAG ID and the second TAG ID are included in power control information in the RRC message, the first TAG ID and the second TAG ID mapped to different path loss reference signals.

Optionally, in some embodiments of any of the preceding aspects, a path loss reference signal mapped to the first TAG ID is indicated by downlink control information (DCI) that schedules transmission of the first signal.

Optionally, in some embodiments of any of the preceding aspects, the first TAG ID and the second TAG ID are included in a Transmission Configuration Indicator (TCI) state configuration in the RRC message, the first TAG ID and the second TAG ID mapped to different TCI states.

Optionally, in some embodiments of any of the preceding aspects, a TCI state mapped to the first TAG ID is indicated by downlink control information (DCI) that schedules transmission of the first signal.

Optionally, in some embodiments of any of the preceding aspects, a TCI state mapped to the first TAG ID is included in a control resource set (CORESET) associated with the first signal.

Optionally, in some embodiments of any of the preceding aspects, the first TAG ID and the second TAG ID are included in a Non-Zero Power Channel State Information reference signal (NZP-CSI-RS) configuration in the RRC message, the first TAG ID and the second TAG ID mapped to different NZP-CSI-RS resources.

Optionally, in some embodiments of any of the preceding aspects, an NZP-CSI-RS resource mapped to the first TAG ID is indicated by downlink control information (DCI) that schedules transmission of the first signal.

According to another aspect of the present disclosure, a method for uplink synchronization is provided, wherein the method includes transmitting, by a first base station of a network, an RRC message to a UE, the RRC message comprising a first TAG ID and a second TAG ID different than the first TAG ID. The method also includes determining, by the first base station, a first timing advance associated with the first TAG ID for a first signal and a second timing advance associated with the second TAG ID for a second signal, the first signal and the second signal being transmitted from the UE over the same component carrier, and transmitting, by the first base station, the first timing advance and the second timing advance to the UE.

Optionally, in some embodiments of any of the preceding aspects, the method also includes receiving, by the first base station, the first signal from the UE in accordance with the first timing advance, and receiving, by a second base station of the network, the second signal from the UE in accordance with the second timing advance.

Optionally, in some embodiments of any of the preceding aspects, the method further includes receiving, by the first base station, the first signal and the second signal from the UE in accordance with separate beams.

According to another aspect of the present disclosure, a UE is provided, wherein the UE comprises a non-transitory memory storage comprising instructions, and one or more processors in communication with the non-transitory memory storage, wherein the one or more processors execute the instructions to receive an RRC message from a network, the RRC message comprising a first TAG ID and a second TAG ID different than the first TAG ID, and transmit a first signal over a component carrier in accordance with a timing advance associated with the first TAG ID and a second signal over the component carrier in accordance with a timing advance associated with the second TAG ID.

Optionally, in some embodiments of any of the preceding aspects, the one or more processors further execute the instructions to transmit the first signal to a first base station and transmit the second signal to a second base station.

Optionally, in some embodiments of any of the preceding aspects, the one or more processors further execute the instructions to transmit the first signal and the second signal to a same base station using separate beams.

According to another aspect of the present disclosure, a first base station is provided, wherein the first base station comprises a non-transitory memory storage comprising instructions, and one or more processors in communication with the non-transitory memory storage, wherein the one or more processors execute the instructions to transmit an RRC message to a UE, the RRC message comprising a first TAG ID and a second TAG ID different than the first TAG ID, determine a first timing advance associated with the first TAG ID for a first signal and a second timing advance associated with the second TAG ID for a second signal, the first signal and the second signal being transmitted from the UE over the same component carrier, and transmit the first timing advance and the second timing advance to the UE.

Optionally, in some embodiments of any of the preceding aspects, the one or more processors further execute the instructions to receive the first signal from the UE in accordance with the first timing advance, the second signal being transmitted from the UE to a second base station of the network in accordance with the second timing advance.

Optionally, in some embodiments of any of the preceding aspects, the one or more processors further execute the instructions to receive the first signal and the second signal from the UE in accordance with separate beams.

Optionally, in some embodiments of any of the preceding aspects, the first TAG ID and the second TAG ID are included in power control information for a PUSCH, the power control information included in an RRC message, the first TAG ID and the second TAG ID mapped to different path loss reference signals.

Optionally, in some embodiments of any of the preceding aspects, a path loss reference signal mapped to the first TAG ID is indicated by DCI that schedules transmission of the first signal.

Optionally, in some embodiments of any of the preceding aspects, the first TAG ID and the second TAG ID are included in a TCI state configuration, the TCI state configuration included in an RRC message, the first TAG ID and the second TAG ID mapped to different TCI states.

Optionally, in some embodiments of any of the preceding aspects, a TCI state mapped to the first TAG ID is indicated by DCI that schedules transmission of the first signal.

Optionally, in some embodiments of any of the preceding aspects, a TCI state mapped to the first TAG ID is included in a CORESET associated with the first signal.

Optionally, in some embodiments of any of the preceding aspects, the first TAG ID and the second TAG ID are included in a NZP-CSI-RS configuration, the NZP-CSI-RS configuration included in an RRC message, the first TAG ID and the second TAG ID mapped to different NZP-CSI-RS resources.

Optionally, in some embodiments of any of the preceding aspects, an NZP-CSI-RS resource mapped to the first TAG ID is indicated by DCI that schedules transmission of the first signal.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
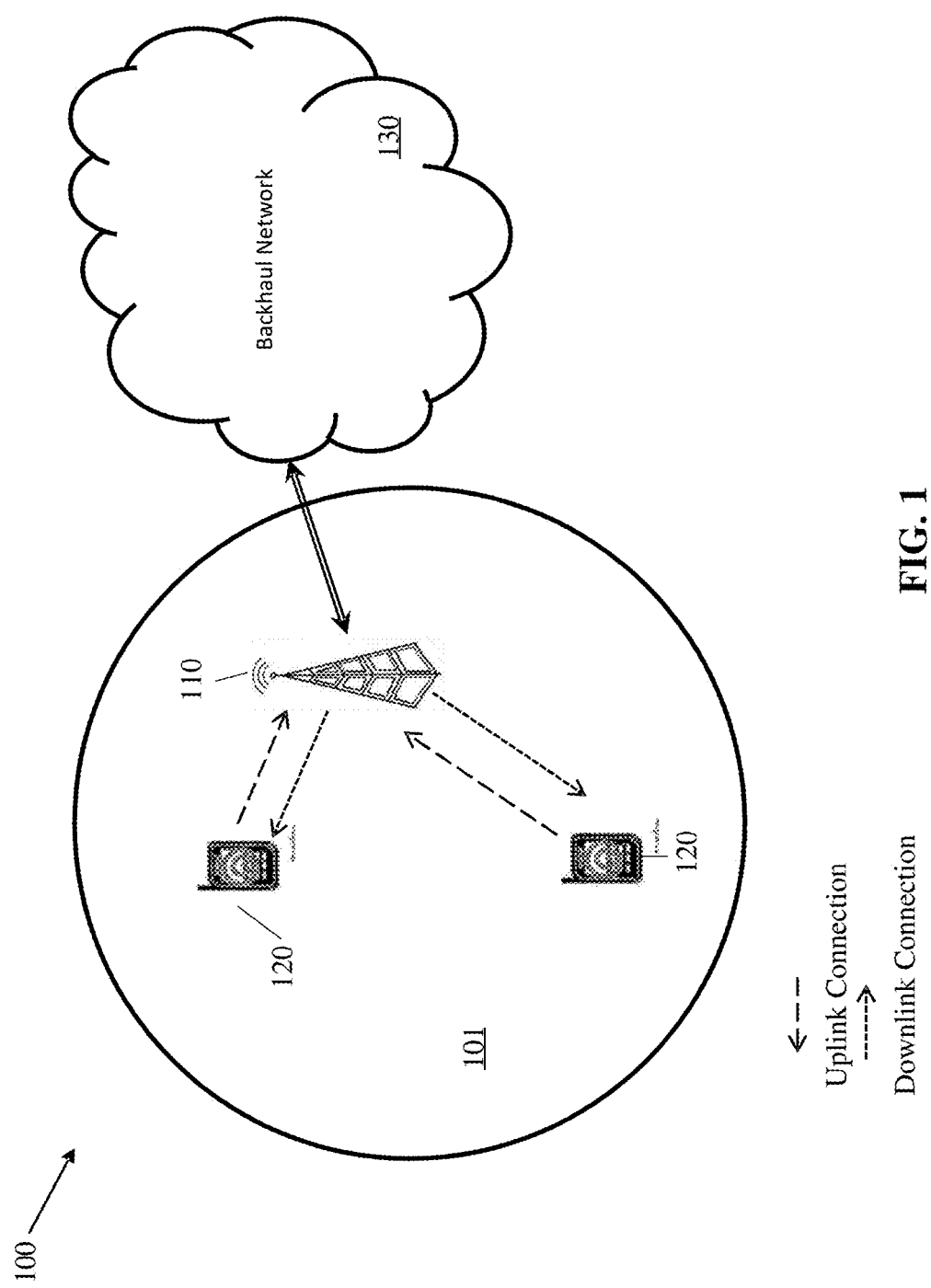
FIG. 1 illustrates an embodiment network architecture.

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Uplink transmissions are generally considered synchronized when they arrive at a base station within a certain time period (e.g., one cyclic prefix (CP)) of one another. Otherwise they are considered unsynchronized, and as a result interfere with each other. User equipments (UEs) that communicate with a base station are usually scattered within a coverage area of the base station. Depending on specific locations of each UE, uplink transmissions from the UEs may experience different propagation delays, which may cause significant variations in their arrival times. To compensate for the difference in the arrival times, a UE may adjust the timing advance of its uplink transmission. Conventional synchronization techniques often require a UE to apply the same timing advance to its uplink transmissions communicated to the same base station over the same component carrier. Such techniques may be unsuitable for next generation wireless networks, where uplink transmissions over the same component carrier may travel through separate propagation paths, and thus have different propagation delays. To solve the above issue, advanced uplink synchronization techniques are desired.

Embodiments of this disclosure provide mechanisms that permit a UE to apply different timing advances to uplink transmissions communicated over the same component carrier. Uplink transmissions that are communicated through similar propagation paths over the same component carrier may be grouped together in what is referred to herein as a Timing Advance Group (TAG). A different timing advance may be configured for each TAG. Uplink transmissions belonging to the same TAG may use the same timing advance. In some embodiments, a UE receives a TAG configuration from a network. The TAG configuration may be included in a radio resource control (RRC) message and may comprise multiple TAG identities (IDs). Each TAG ID represents a TAG and is mapped to at least one signal to be transmitted by the UE. After receiving the TAG configuration, the UE may transmit multiple signals to the network over the same component carrier in accordance with timing advances associated with corresponding TAG IDs mapped to the respective signals. The signals may be transmitted to different base stations and/or different remote radio heads (RRHs) connected to a common base station. Alternatively, the signals may be transmitted to the same base station using separate beams. These and other aspects are discussed in greater detail as below.

FIG. 1 is a network 100 for communicating data. The network 100 comprises a base station 110 having a coverage area 101, a plurality of UEs 120, and a backhaul network 130. As shown, the base station 110 establishes uplink (dashed line) and/or downlink (dotted line) connections with the user equipments (UEs) 120, which serve to carry signals from the UEs 120 to the base station 110 and vice-versa. Signals carried over the uplink/downlink connections may include traffic data and reference signals communicated between the UEs 120, as well as data communicated to/from a remote-end (not shown) by way of the backhaul network 130. As used herein, the term "base station" refers to any component (or collection of components) configured to provide wireless access to a network, such as a Transmit and Receive Point (TRP), an enhanced Node B (eNB), a next (fifth) generation (5G) NodeB (gNB), a macro-cell, a femtocell, a Wi-Fi access point (AP), or other wirelessly enabled devices. The base station 110 may provide wireless access in accordance with one or more wireless communication protocols, e.g., 5th generation new radio (5G_NR), long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2:
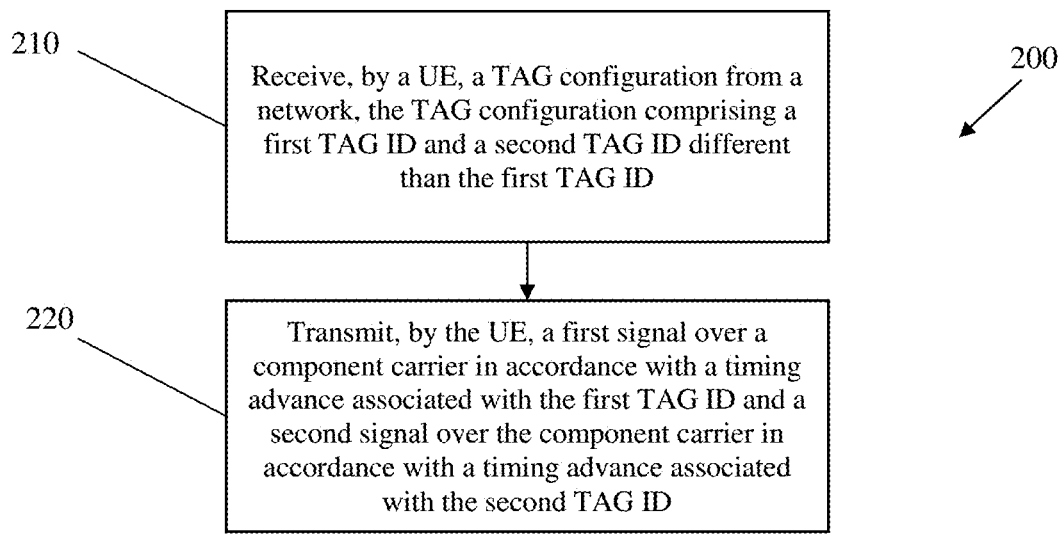
FIG. 2 is a flowchart of an embodiment uplink synchronization method performed by a user equipment (UE)

FIG. 2 is a flowchart of an embodiment method 200 for uplink synchronization performed by a UE. At step 210, the UE receives a TAG configuration from a network. The TAG configuration comprises multiple TAG IDs including a first TAG ID and a second TAG ID, where the second TAG ID is different than the first TAG ID. It is understood that two TAG IDs are purely for the purpose of illustration and it should be appreciated that more than two TAG IDs may be implemented based on the present disclosure.

At step 220, the UE transmits a first signal and a second signal over a component carrier in accordance with timing advances associated with a first TAG ID and a second TAG ID, respectively. The UE may receive the TAG configuration from a base station of the network that communicates with the UE. The base station may determine a corresponding timing advance associated with each of the multiple TAG IDs, and send the timing advances to the UE. The base station may estimate a propagation delay between the base station and the UE, and may determine the timing advance based thereon. For example, the timing advance may be a value twice the propagation delay. Due to mobility of the UE, the timing advance may be dynamically adjusted by the base station in accordance with propagation paths between a current location of the UE and the base station. The UE may receive an initial timing advance from the base station in a Random Access Response (RAR) command during a random access procedure. The RAR command may include at least a TAG ID and an initial timing advance associated with the TAG ID. When the UE relocates, the base station may estimate an updated timing advance, and send a Media Access Controls (MAC) Control Element (CE) to the UE. The MAC CE may include the TAG ID and the updated timing advance. Alternatively, the MAC CE may include the TAG ID and a difference between the updated timing advance and the initial timing advance.

In order to extend cellular coverage and improve performance of signal reception, the network may adopt joint reception techniques, where multiple network devices in the same serving cell jointly receive and combine signals transmitted from a UE. The signals transmitted from the UE to the multiple network devices may experience different propagation delays. In one embodiment, the multiple network devices are base stations (sometimes known as Transmit and Receive Points (TRPs)) located in different positions. The UE transmits the first signal to a first base station, and transmits the second signal to a second base station. The first base station and the second base station may have the same NR cell ID. In another embodiment, the multiple network devices are RRHs separately located but connected to a common base station. An RRH is generally a remotely located radio transceiver that is connected to a base station, and may include at least a radio frequency (RF) circuit for the base station. The UE may transmit the first signal to a first RRH, and transmit the second signal to a second RRH.

Both the UE and the base station may use beamforming to compensate path loss of a wireless signal during a transmission, especially when the wireless signal is communicated at high frequencies (e.g., millimeter Wave (mmW)). In one embodiment, the UE transmits the first signal and the second signal to the same base station using separate beams. In another embodiment, the UE transmits the first signal to a first base station using a first beam, and transmits the second signal to a second base station using a second beam.

Figure 3:
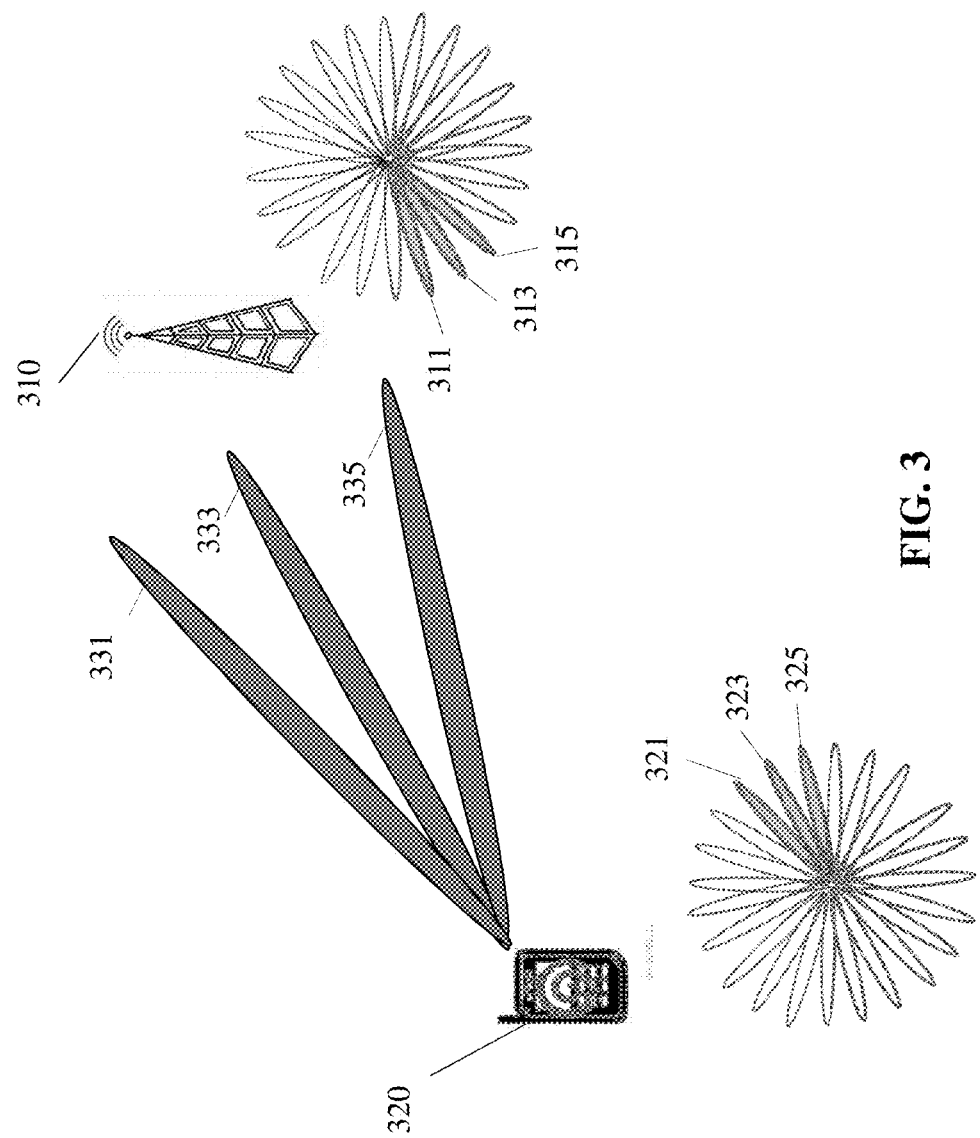
FIG. 3 is a diagram of uplink transmissions using beamforming.

FIG. 3 is a diagram of uplink transmissions using a beamforming technique. Beamforming may be used to improve both transmission (TX) and reception (RX) performance. As shown, a UE 320 transmits signals 331, 333, 335 using TX beams 321, 323, 325 (respectively), and a base station 310 receives the signals 331, 333, 335 using RX beams 311, 313, 315. As used herein, the term "beam direction" refers to a radio antenna pattern, or set of beamforming weights, that is used for directional signal transmission and/or reception. The terms "beam directions" and "beams" are used interchangeably herein. Although UE 320 transmits signals to only one base station in the example depicted by FIG. 3, it should be appreciated that UE 320 may transmit signals to another base station (not shown in FIG. 3) using either the same TX beams or another set of TX beams.

Conventional synchronization techniques may map a TAG ID to a serving cell, so that uplink transmissions from a UE connected to the serving cell are configured with the same TAG ID and use the same timing advance. For example, in 5G_NR, a TAG configuration is included in a radio resource control (RRC) message. The TAG configuration comprises a serving cell and a TAG ID associated with the serving cell. For example, a base station may transmit a SCellConfig information element to a UE to configure a serving cell. Tables 1A-1B show content of a SCellConfig information element defined in 3rd Generation Partnership Project (3GPP) protocol Release 15. As shown in Table 1A, the SCellConfig information element includes an index for the serving cell sCellIndex, and other parameters sCellConfigCommon and sCellConfigDedicated. Specifically, as shown in Table 1B, sCellConfigDedicated includes a TAG ID. After the UE receives the SCellConfig information element, whenever the UE communicates uplink transmissions to serving cell sCellIndex, the UE will apply a timing advance associated with the TAG ID included in SCellConfig. The TAG configuration may comprise information of multiple serving cells and a corresponding TAG ID associated with each of the multiple serving cells. For example, in 3GPP protocol a base station may transmit a parameter named sCellToAddModList to a UE to configure multiple serving cells. The parameter sCellToAddModList may include multiple SCellConfig information elements.

However, as already mentioned, uplink transmissions from a UE to different base stations, TRPs, or RRHs using either the same beam or different beams within the same serving cell or on the same component carrier may experience different propagation delays. Thus, applying different timing advances to these uplink transmissions may be beneficial to uplink synchronization. To this end, different TAG configuration methods are provided in this disclosure.

TABLE 1A

| SCellConfig ::=SEQUENCE { | |
|---|---|
| sCellIndex SCellIndex, | |
| sCellConfigCommon | OPTIONAL, -- Cond |
| ServingCellConfigCommon | SCellAdd |
| sCellConfigDedicatedServingCellConfig | OPTIONAL, -- Cond |
| SCellAddMod | |
| ... | |
| } | |

TABLE 1B

| ServingCellConfig ::= | SEQUENCE { |
|---|---|
| ... | |
| tag-Id | TAG-Id, |
| ... | |
| } | |

In some embodiments, each TAG ID in a TAG configuration is mapped to a corresponding path loss reference signal. Prior to an uplink transmission (e.g., an uplink transmission on either a Physical Uplink Shared Channel (PUSCH) or a Physical Uplink Control Channel (PUCCH)), the UE may select a path loss reference signal for the uplink transmission. The UE may follow a reference signal selection procedure similar to those described in 3rd Generation Partnership Project (3GPP) protocol 38.213 Section 7.1. The UE performs measurements using the selected path loss reference signal and adjusts power of the uplink transmission in accordance with the performed measurements. Thus, a TAG ID mapped to the selected path loss reference signal is associated with the uplink transmission. Then the UE may apply a timing advance associated with the TAG ID to the uplink transmission.

Figure 4:
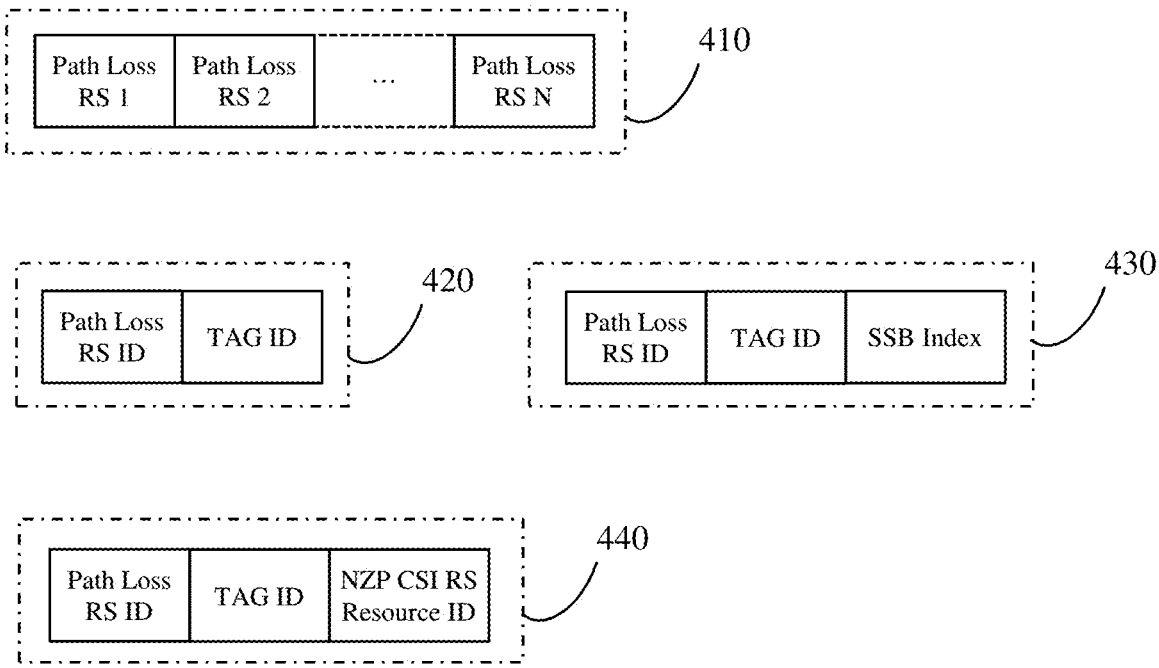
FIG. 4 is an embodiment Timing Advance Group (TAG) configuration comprising TAG IDs mapped to path loss reference signals.

FIG. 4 is an embodiment TAG configuration 410 comprising TAG IDs mapped to path loss reference signals. TAG configuration 410 includes N fields, each field indicating a different path loss reference signal. As shown in example 420, each field may include an ID of a path loss reference signal and a TAG ID mapped to the path loss reference signal. Each field may also include more information of the path loss reference signal. In example 430, if the path loss reference signal in a field is a Synchronization Signal Block (SSB), the field may include a location of the SSB (e.g., SSB index). In example 440, if the path loss reference signal in a field is a Channel State Information Reference Signal (CSI-RS), the field may include a location of the CSI-RS (e.g., Non-Zero Power (NZP) CSI-RS resource ID).

The TAG configuration may be included in power control information in an RRC message transmitted from the network to the UE, and may be encoded in Abstract Syntax Notation One (ASN.1) format. For example, the power control information may include one or more information elements. Each of the information elements may have a structure illustrated by Table 2A and Table 2B. The PUSCH-PathlossReferenceRS information element in Table 2A may be power control information for a PUSCH. The TAG ID included in the PUSCH-PathlossReferenceRS information element is mapped to a path loss reference signal indicated by this information element. The PUCCH-PathlossReferenceRS information element in Table 2B may be power control information for a PUCCH. The TAG ID included in the PUCCH-PathlossReferenceRS information element is mapped to a path loss reference signal indicated by this information element.

TABLE 2A

| PUSCH-PathlossReferenceRS ::= | SEQUENCE { |
|---|---|
| pusch-PathlossReferenceRS-Id | PUSCH-PathlossReferenceRS-Id, |
| referenceSignal | CHOICE { |
| ssb-Index | SSB-Index, |
| csi-RS-Index | NZP-CSI-RS-ResourceId |
| } | |
| pusch-tag-Id | TAG-ID |
| } | |

TABLE 2B

| PUCCH-PathlossReferenceRS ::= | SEQUENCE { |
|---|---|
| pucch-PathlossReferenceRS-Id | PUCCH-PathlossReferenceRS-Id, |
| referenceSignal | CHOICE { |
| ssb-Index | SSB-Index, |
| csi-RS-Index | NZP-CSI-RS-ResourceId |
| } | |
| pucch-tag-Id | TAG-ID |
| } | |

In one embodiment, mapping between a path loss reference signal and a TAG ID is mandatory. For example, a UE may receive a TAG configuration only including TAG IDs mapped to path loss reference signals. The UE may not receive a TAG ID associated with a serving cell.

In another embodiment, the mapping between a path loss reference signal and a TAG ID is optional. For example, the UE may receive a SCellConfig information element which includes a TAG ID mapped to a serving cell (e.g., as illustrated in Tables 1A and 1B). If the UE does not receive TAG IDs mapped to path loss reference signals, the UE may apply the TAG configuration included in the SCellConfig information element. If the UE receive TAG IDs mapped to path loss reference signals, the UE may start using these mappings, and ignore the TAG configuration included in the SCellConfig information element.

Figure 5:
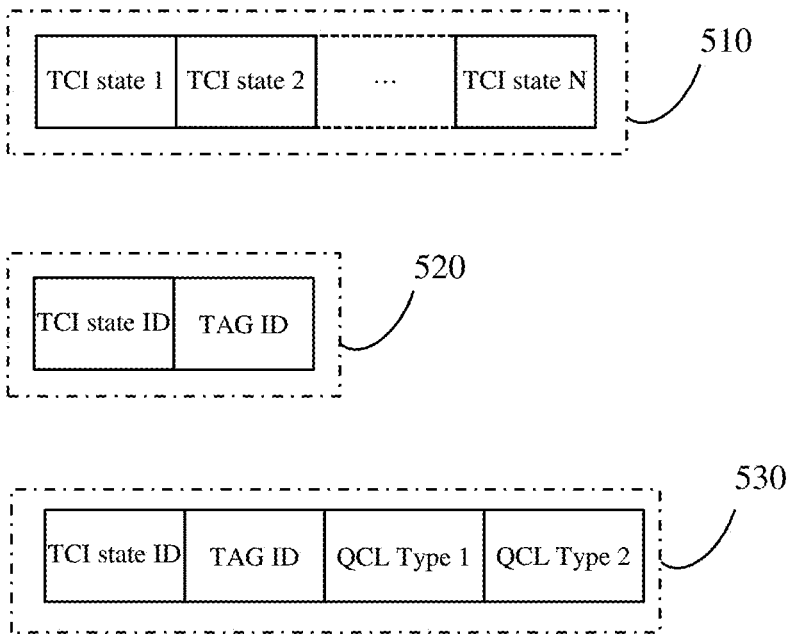
FIG. 5 is an embodiment TAG configuration comprising TAG IDs mapped to transmission configuration indicator (TCI) states.

In some embodiments, each TAG ID in a TAG configuration is mapped to a corresponding transmission configuration indicator (TCI) state. A TCI state usually indicates information of a TX beam that a Physical Downlink Control Channel (PDCCH) uses, such as Quasi-Co-Location (QCL) parameters of a Demodulation Reference Signal (DMRS) antenna port. FIG. 5 is an embodiment TAG configuration 510 comprising TAG IDs mapped to TCI states. TAG configuration 510 includes N fields, each field indicating a different TCI state. As shown in example 520, each field may include a TCI state ID and a corresponding TAG ID. Each field may also include some other information of a TCI state. In example 530, each field may include QCL type 1 and QCL type 2.

The TAG configuration including TAG IDs mapped to TCI states may be included in a TCI state configuration in an RRC message transmitted from the network to the UE, and may be encoded in ASN.1 format. For example, the TCI state configuration may include one or more TCI-State information elements. Each of the information elements may have a structure illustrated by Table 3. The TAG ID included in the TCI-State information element in Table 3 is mapped to a TCI state indicated by this information element.

TABLE 3

```
TCI-State ::= SEQUENCE {
    tci-StateId    TCI-StateId,
    qcl-Type1      QCL-Info,
    qcl-Type2      QCL-Info       OPTIONAL, -- Need R
    tci-tag-Id     TAG-ID
    ...
}
```

When a UE receives a TAG configuration including TAG IDs mapped to TCI states, the UE may treat mapping between TAG IDs and TCI states as an optional configuration. For example, the UE may receive a SCellConfiginformation element which includes a TAG ID mapped to a serving cell (e.g., as illustrated in Tables 1A and 1B). If the UE does not receive TAG IDs mapped to TCI states, the UE may apply the TAG configuration included in the SCellConfiginformation element. If the UE receive TAG IDs mapped to TCI states, the UE may start using these mappings, and ignore the TAG configuration included in the SCellConfig-information element.

In one embodiment, during a time slot, the UE may receive a PDCCH located in a control resource set (CORESET), and a TCI state may have been assigned to the UE to decode the PDCCH. When the UE has an uplink transmission to be communicated in this time slot, the UE may select a TAG ID mapped to the TCI state, and apply a timing advance associated with the TAG ID to the uplink transmission.

In another embodiment, an uplink transmission is scheduled by downlink control information (DCI) (e.g., DCI format 0-1) carried in a PDCCH. The DCI may include a 3-bit field indicating a TCI state. The UE may select a TAG ID mapped to the TCI state, and apply a timing advance associated with the TAG ID to the uplink transmission.

Figure 6:
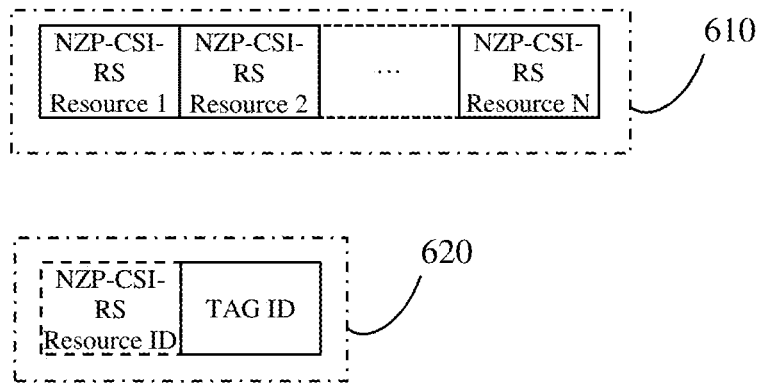
FIG. 6 is an embodiment TAG configuration comprising TAG IDs mapped to Non-Zero Power (NZP) Channel State Information Reference Signal (CSI-RS) resources.

In some embodiments, each TAG ID in a TAG configuration is mapped to an NZP-CSI-RS resource, a type of CSI-RS used for channel measurements for the purpose of reporting. FIG. 6 is an embodiment TAG configuration 610 comprising TAG IDs mapped to NZP-CSI-RS resources. TAG configuration 610 includes N fields, each field indicating a different NZP-CSI-RS resource from an NZP-CSI-RS resource set. As shown in example 620, each field may include an NZP-CSI-RS resource ID and a corresponding TAG ID. Each field may not include an explicit NZP-CSI-RS resource ID. Instead, an NZP-CSI-RS resource ID may be indicated by a location of a field within the TAG configuration.

The TAG configuration including TAG IDs mapped to NZP-CSI-RS resources may be included in a NZP-CSI-RS configuration in an RRC message transmitted from the network to the UE, and may be encoded in ASN.1 format. For example, the NZP-CSI-RS configuration may include one or more NZP-CSI-RS-Resource information elements. Each of the information elements may have a structure illustrated by Table 4. The TAG ID included in the NZP-CSI-RS-Resource information element in Table 4 is mapped to a NZP-CSI-RS resource indicated by this information element.

TABLE 4

```
NZP-CSTRS-Resource ::=          SEQUENCE {
    nzp-CSI-RS-ResourceId       NZP-CSI-RS-ResourceId,
    resourceMapping             CSI-RS-ResourceMapping,
    nzp-CSTRS-tag-Id    TAG-ID,
    ...
}
```

When a UE receives a TAG configuration including TAG IDs mapped to NZP-CSI-RS resources, the UE may treat mapping between TAG IDs and NZP-CSI-RS resources as an optional configuration. For example, the UE may receive a SCellConfiginformation element which includes a TAG ID mapped to a serving cell (e.g., as illustrated in Tables 1A and 1B). If the UE does not receive TAG IDs mapped to NZP-CSI-RS resources, the UE may apply the TAG configuration included in the SCellConfig information element. If the UE receive TAG IDs mapped to NZP-CSI-RS resources (e.g., as illustrated in FIG. 6), the UE may start using these mappings, and ignore the TAG configuration included in the SCellConfiginformation element.

Figure 7:
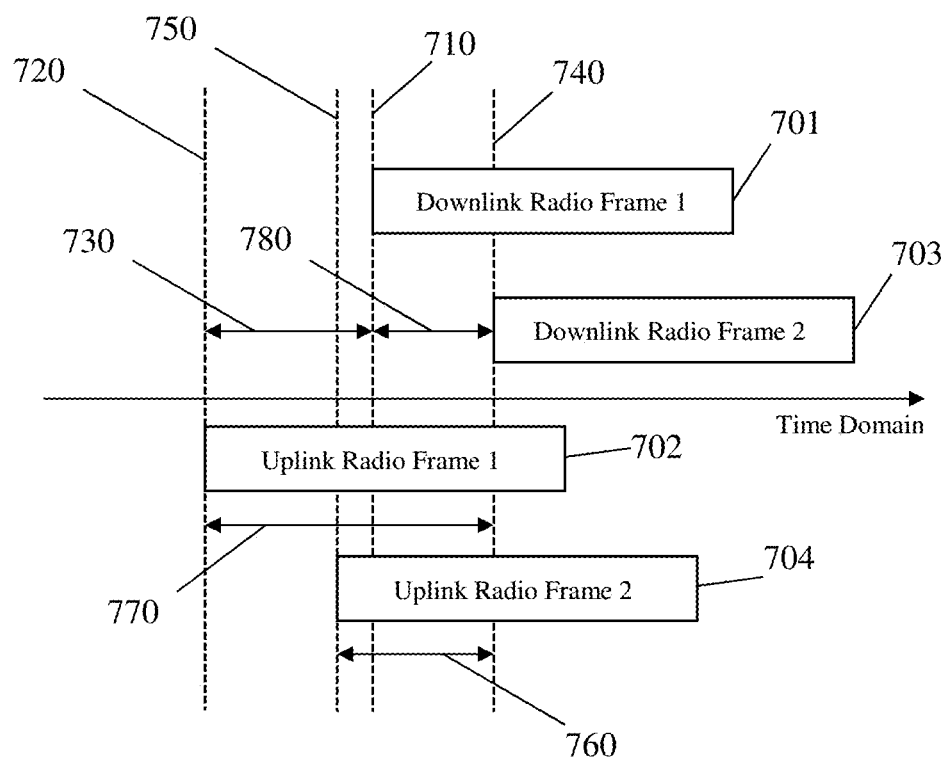
FIG. 7 is an embodiment reference time selection method.

A UE generally uses an arrival time of a downlink radio frame as a reference time for its uplink transmissions. By applying a timing advance to an uplink transmission, the UE may transmit the uplink transmission the timing advance earlier than the reference time. For example, in FIG. 7, a UE receives a downlink radio frame 701 from a first base station at time 710. If a timing advance 730 has been configured for an uplink radio frame 702 from the UE, then the UE transmits uplink radio frame 702 at time 720.

In a joint reception case that involves multiple base stations, the UE may receive a downlink radio frame 703 from a second base station at time 740. When the UE applies timing advances to its uplink transmissions to the second base station, the UE may use time 740 as the reference. For example, if a timing advance 760 has been configured for an uplink radio frame 704 from the UE, then the UE may transmit uplink radio frame 704 at time 750. Alternatively, the UE may use one of time 710 and time 740 as the reference for uplink transmissions to both the first base station and the second base station. In this case, depending on which reference is being used and which base station the uplink transmission is transmitted to, the UE may adjust the timing advances configured for the UE by considering a difference 780 between time 710 and time 740. For instance, if time 740 is chosen as the reference time, timing advance 760 still applies to the transmission of uplink radio frame 704. However, uplink radio frame 702 should use a new timing advance 770, which is equal to the sum of timing advance 730 and the difference 780.

Figure 8:
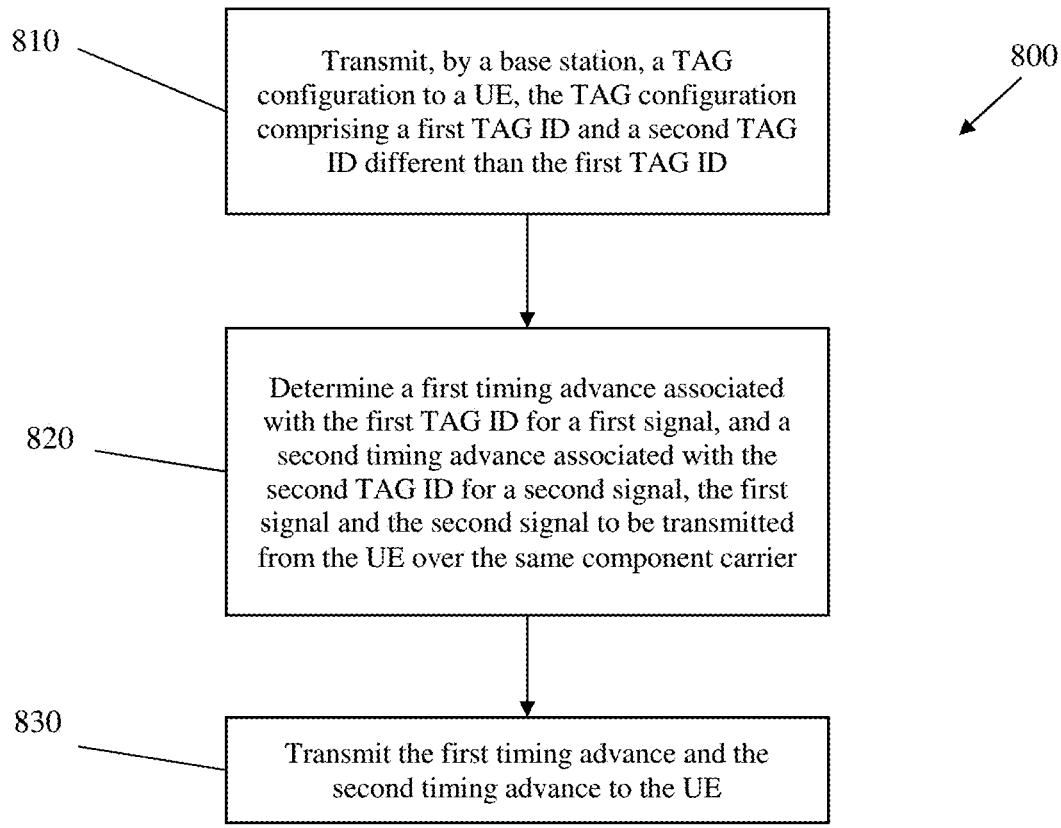
FIG. 8 is a flowchart of an embodiment uplink synchronization method performed by a base station.

FIG. 8 is a flowchart of an embodiment method 800 for uplink synchronization performed by a base station. At step 810, the base station transmits a TAG configuration to the UE. The TAG configuration comprises multiple TAG IDs including a first TAG ID and a second TAG ID, where the second TAG ID is different than the first TAG ID. At step 820, the base station determines multiple timing advances including a first timing advance for and the second timing advance. Each of the multiple timing advances is for a signal to be transmitted from the UE, and is associated with one of the multiple TAG IDs. The first timing advance associated with the first TAG ID is determined for a first signal, and the second timing advance associated with the second TAG ID is determined for a second signal, where the first signal and the second signal are to be transmitted from the UE over the same component carrier. At step 830, the base station transmits the multiple timing advances to the UE. In one example, each of the multiple timing advances may be included in a RAR command during a random access procedure. In another example, each of the multiple timing advances may be included a MAC CE transmitted from the base station to the UE.

In one embodiment, the base station may receive the first signal from the UE in accordance with the first timing advance. Another base station may receive the second signal from the UE in accordance with the second timing advance. The base station and the other base station belong to the same network. In another embodiment, the base station receives the first signal and the second signal from the UE using separate beams.

Figure 9A:
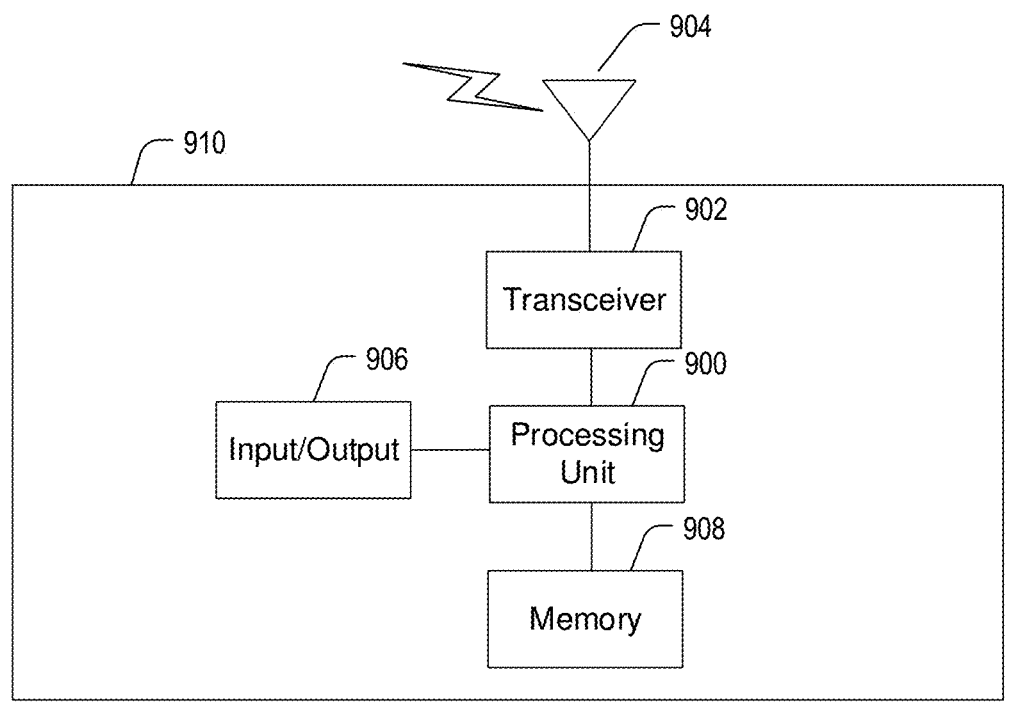
FIGS. 9A-B illustrate block diagrams of embodiment devices.
Figure 9B:
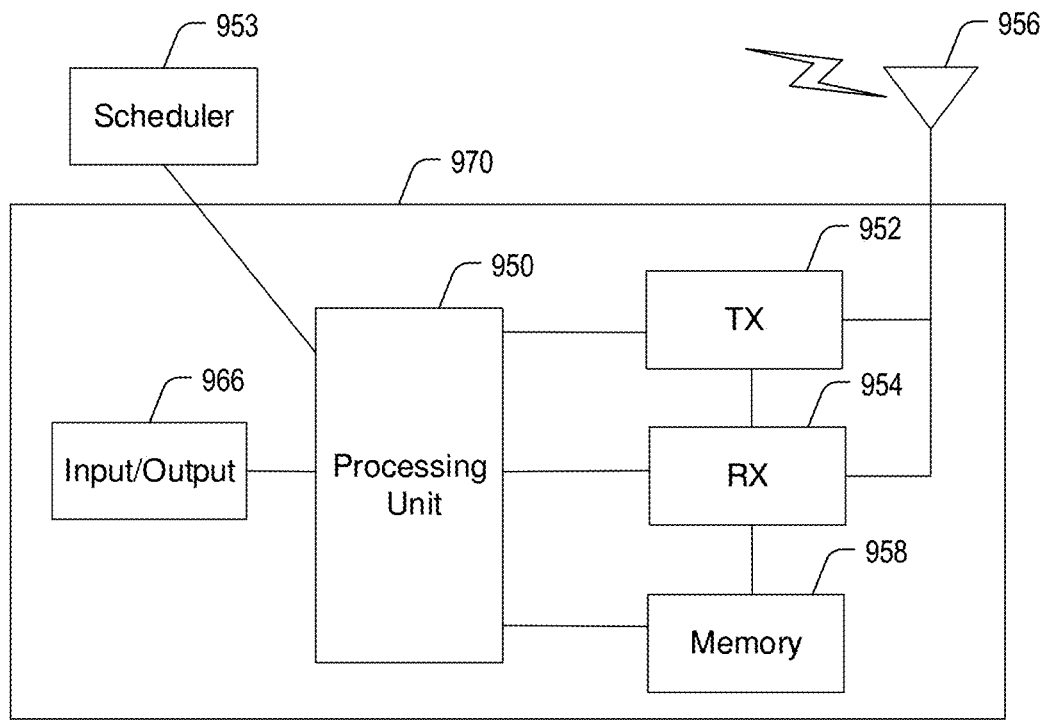

FIGS. 9A and 9B illustrate example devices that may implement the methods and teachings according to this disclosure. In particular, FIG. 9A illustrates an example UE 910, and FIG. 9B illustrates an example base station 970.

As shown in FIG. 9A, the UE 910 includes at least one processing unit 900. The processing unit 900 implements various processing operations of the UE 910. For example, the processing unit 900 could perform signal coding, data processing, power control, input/output processing, or any other functionality enabling the UE 910 to operate in the network. The processing unit 900 may also be configured to implement some or all of the functionality and/or embodiments described in more detail above. Each processing unit 900 includes any suitable processing or computing device configured to perform one or more operations. Each processing unit 900 could, for example, include a microprocessor, microcontroller, digital signal processor, field programmable gate array, or application specific integrated circuit.

The UE 910 also includes at least one transceiver 902. The transceiver 902 is configured to modulate data or other content for transmission by at least one antenna or Network Interface Controller (NIC) 904. The transceiver 902 is also configured to demodulate data or other content received by the at least one antenna 904. Each transceiver 902 includes any suitable structure for generating signals for wireless transmission and/or processing signals received. Each antenna 904 includes any suitable structure for transmitting and/or receiving wireless signals. One or multiple transceivers 902 could be used in the UE 910, and one or multiple antennas 904 could be used in the UE 910. Although shown as a single functional unit, a transceiver 902 could also be implemented using at least one transmitter and at least one separate receiver.

The UE 910 further includes one or more input/output devices 906 or interfaces. The input/output devices 906 permit interaction with a user or other devices in the network. Each input/output device 906 includes any suitable structure for providing information to or receiving information from a user, such as a speaker, microphone, keypad, keyboard, display, or touch screen, including network interface communications.

In addition, the UE 910 includes at least one memory 908. The memory 908 stores instructions and data used, generated, or collected by the UE 910. For example, the memory 908 could store software instructions or modules configured to implement some or all of the functionality and/or embodiments described above and that are executed by the processing unit(s) 900. Each memory 908 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. It is understood that the components as shown in FIG. 9A is for the purpose of illustration and the UE 910 may include part or all of the components illustrated in FIG. 9A.

As shown in FIG. 9B, the base station 970 includes at least one processing unit 950, at least one transmitter 952, at least one receiver 954, one or more antennas 956, at least one memory 958, and one or more input/output devices or interfaces 966. A transceiver, not shown, may be used instead of the transmitter 952 and receiver 954. A scheduler 953 may be coupled to the processing unit 950. The scheduler 953 may be included within or operated separately from the base station 970. The processing unit 950 implements various processing operations of the base station 970, such as signal coding, data processing, power control, input/output processing, or any other functionality. The processing unit 950 can also be configured to implement some or all of the functionality and/or embodiments described in more detail above. Each processing unit 950 includes any suitable processing or computing device configured to perform one or more operations. Each processing unit 950 could, for example, include a microprocessor, microcontroller, digital signal processor, field programmable gate array, or application specific integrated circuit. It is understood that the components as shown in FIG. 9B is for the purpose of illustration and the base station 970 may include part or all of the components illustrated in FIG. 9B.

Each transmitter 952 includes any suitable structure for generating signals for wireless transmission to one or more UEs or other devices. Each receiver 954 includes any suitable structure for processing signals received from one or more UEs or other devices. Although shown as separate components, at least one transmitter 952 and at least one receiver 954 could be combined into a transceiver. Each antenna 956 includes any suitable structure for transmitting and/or receiving wireless or wired signals. Although a common antenna 956 is shown here as being coupled to both the transmitter 952 and the receiver 954, one or more antennas 956 could be coupled to the transmitter(s) 952, and one or more separate antennas 956 could be coupled to the receiver(s) 954. Each memory 958 includes any suitable volatile and/or non-volatile storage and retrieval device(s) such as those described above in connection to the UE 910. The memory 958 stores instructions and data used, generated, or collected by the base station 970. For example, the memory 958 could store software instructions or modules configured to implement some or all of the functionality and/or embodiments described above and that are executed by the processing unit(s) 950.

Each input/output device 966 permits interaction with a user or other devices in the network. Each input/output device 966 includes any suitable structure for providing information to or receiving/providing information from a user, including network interface communications.

Figure 10:
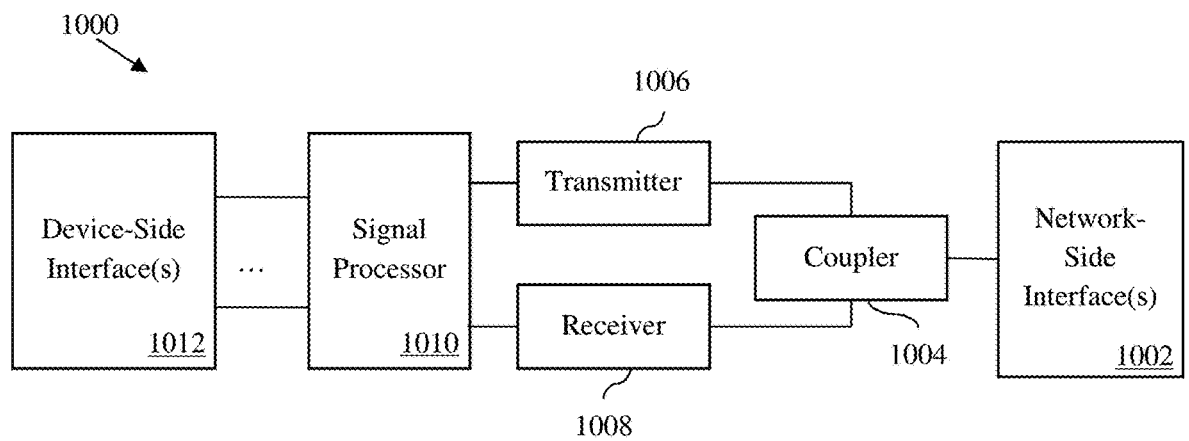
FIG. 10 illustrates a block diagram of an embodiment transceiver.

FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 1200, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., LTE, etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for uplink synchronization, the method comprising:
   receiving, by a user equipment (UE), a radio resource control (RRC) message from a network, the RRC message comprising a first Timing Advance Group (TAG) identity (ID) and a second TAG ID different than the first TAG ID, wherein the first TAG ID and the second TAG ID are configured according to at least one of following options: 1) the first TAG ID and the second TAG ID are included in power control information in the RRC message, wherein the first TAG ID and the second TAG ID are mapped to different path loss reference signals; 2) the first TAG ID and the second TAG ID are included in a Transmission Configuration Indicator (TCI) state configuration in the RRC message, wherein the first TAG ID and the second TAG ID are mapped to different TCI states; or 3) the first TAG ID and the second TAG ID are included in a Non-Zero Power Channel State Information reference signal (NZP-CSI-RS) configuration in the RRC message, wherein the first TAG ID and the second TAG ID are mapped to different NZP-CSI-RS resources; and transmitting, by the UE, a first signal over a component carrier in accordance with a timing advance associated with the first TAG ID and a second signal over the component carrier in accordance with a timing advance associated with the second TAG ID.

2. The method of claim 1, wherein the first signal is transmitted to a first base station and the second signal is transmitted to a second base station.

3. The method of claim 1, wherein the first signal and the second signal are transmitted to a same base station using separate beams.

4. The method of claim 1, wherein a path loss reference signal mapped to the first TAG ID is indicated by downlink control information (DCI) that schedules transmission of the first signal.

5. The method of claim 1, wherein a TCI state mapped to the first TAG ID is indicated by downlink control information (DCI) that schedules transmission of the first signal.

6. The method of claim 1, wherein a TCI state mapped to the first TAG ID is included in a control resource set (CORESET) associated with the first signal.

7. The method of claim 1, wherein an NZP-CSI-RS resource mapped to the first TAG ID is indicated by downlink control information (DCI) that schedules transmission of the first signal.

8. A method for uplink synchronization, the method comprising:

transmitting, by a first base station of a network, a radio resource control (RRC) message to a user equipment (UE), the RRC message comprising a first Timing Advance Group (TAG) identity (ID) and a second TAG ID different than the first TAG ID, wherein the first TAG ID and the second TAG ID are configured according to at least one of following options: 1) the first TAG ID and the second TAG ID are included in power control information in the RRC message, wherein the first TAG ID and the second TAG ID are mapped to different path loss reference signals; 2) the first TAG ID and the second TAG ID are included in a Transmission Configuration Indicator (TCI) state configuration in the RRC message, wherein the first TAG ID and the second TAG ID are mapped to different TCI states; or 3) the first TAG ID and the second TAG ID are included in a Non-Zero Power Channel State Information reference signal (NZP-CSI-RS) configuration in the RRC message, wherein the first TAG ID and the second TAG ID are mapped to different NZP-CSI-RS resources;

determining, by the first base station, a first timing advance associated with the first TAG ID for a first signal and a second timing advance associated with the second TAG ID for a second signal, the first signal and the second signal being transmitted from the UE over the same a component carrier; and transmitting, by the first base station, the first timing advance and the second timing advance to the UE.

9. The method of claim 8, further comprising:

receiving, by the first base station, the first signal from the UE in accordance with the first timing advance; and receiving, by a second base station of the network, the second signal from the UE in accordance with the second timing advance.

10. The method of claim 8, further comprising:

receiving, by the first base station, the first signal and the second signal from the UE in accordance with separate beams.

11. A user equipment (UE) comprising:

a non-transitory memory storage comprising instructions; and one or more processors in communication with the non-transitory memory storage, wherein the one or more processors execute the instructions to:

receive a radio resource control (RRC) message from a network, the RRC message comprising a first Timing Advance Group (TAG) identity (ID) and a second TAG ID different than the first TAG ID, wherein the first TAG ID and the second TAG ID are configured according to at least one of following options: 1) the first TAG ID and the second TAG ID are included in power control information in the RRC message, wherein the first TAG ID and the second TAG ID are mapped to different path loss reference signals; 2) the first TAG ID and the second TAG ID are included in a Transmission Configuration Indicator (TCI) state configuration in the RRC message, wherein the first TAG ID and the second TAG ID are mapped to different TCI states; or 3) the first TAG ID and the second TAG ID are included in a Non-Zero Power Channel State Information reference signal (NZP-CSI-RS) configuration in the RRC message, wherein the first TAG ID and the second TAG ID are mapped to different NZP-CSI-RS resources; and transmit a first signal over a component carrier in accordance with a timing advance associated with the first TAG ID and a second signal over the component carrier in accordance with a timing advance associated with the second TAG ID.

12. The UE of claim 11, wherein the one or more processors further execute the instructions to transmit the first signal to a first base station and transmit the second signal to a second base station.

13. The UE of claim 11, wherein the one or more processors further execute the instructions to transmit the first signal and the second signal to a same base station using separate beams.

14. A first base station of a network, the first base station comprising:

a non-transitory memory storage comprising instructions; and one or more processors in communication with the non-transitory memory storage, wherein the one or more processors execute the instructions to:

transmit a radio resource control (RRC) message to a user equipment (UE), the RRC message comprising a first Timing Advance Group (TAG) identity (ID) and a second TAG ID different than the first TAG ID, wherein the first TAG ID and the second TAG ID are configured according to at least one of following options: 1) the first TAG ID and the second TAG ID are included in power control information in the RRC message, wherein the first TAG ID and the second TAG ID are mapped to different path loss reference signals; 2) the first TAG ID and the second TAG ID are included in a Transmission Configuration Indicator (TCI) state configuration in the RRC message, wherein the first TAG ID and the second TAG ID are mapped to different TCI states; or 3) the first TAG ID and the second TAG ID are included in a Non-Zero Power Channel State Information reference signal (NZP-CSI-RS) configuration in the RRC message, wherein the first TAG ID and the second TAG ID are mapped to different NZP-CSI-RS resources;

determine a first timing advance associated with the first TAG ID for a first signal and a second timing advance associated with the second TAG ID for a second signal, the first signal and the second signal being transmitted from the UE over the same a component carrier; and transmit the first timing advance and the second timing advance to the UE.

15. The first base station of claim 14, wherein the one or more processors further execute the instructions to receive the first signal from the UE in accordance with the first timing advance, the second signal being transmitted from the UE to a second base station of the network in accordance with the second timing advance.

16. The first base station of claim 14, wherein the one or more processors further execute the instructions to receive the first signal and the second signal from the UE in accordance with separate beams.

17. The first base station of claim 14, wherein a path loss reference signal mapped to the first TAG ID is indicated by downlink control information (DCI) that schedules transmission of the first signal.

18. The first base station of claim 14, wherein a TCI state mapped to the first TAG ID is indicated by downlink control information (DCI) that schedules transmission of the first signal.

19. The first base station of claim 14, wherein a TCI state mapped to the first TAG ID is included in a control resource set (CORESET) associated with the first signal.

20. The first base station of claim 14, wherein an NZP-CSI-RS resource mapped to the first TAG ID is indicated by downlink control information (DCI) that schedules transmission of the first signal.

21. The method of claim 1, wherein both the first TAG ID and the second TAG ID are assigned to the component carrier.

22. The method of claim 8, wherein both the first TAG ID and the second TAG ID are assigned to the component carrier.

23. The UE of claim 11, wherein both the first TAG ID and the second TAG ID are assigned to the component carrier.

24. The first base station of claim 14, wherein both the first TAG ID and the second TAG ID are assigned to the component carrier.

* * * * *

UNITED STATES PATENT AND TRADEMARK OFFICE
CERTIFICATE OF CORRECTION

PATENT NO. : 10,779,251 B2
APPLICATION NO. : 16/141709
DATED : September 15, 2020
INVENTOR(S) : Farmanbar et al.

Page 1 of 1

It is certified that error appears in the above-identified patent and that said Letters Patent is hereby corrected as shown below:

In the Claims

In Column 15, Lines 61-62, Claim 8, delete "the UE over the same a component carrier" and insert --the UE over a component carrier--.

In Column 17, Line 10, Claim 14, delete "the UE over the same a component carrier" and insert --the UE over a component carrier--.

Signed and Sealed this
Eighth Day of December, 2020

Andrei Iancu
*Director of the United States Patent and Trademark Office*